United States Patent
Yamasaki et al.

(10) Patent No.: US 11,435,934 B2
(45) Date of Patent: Sep. 6, 2022

(54) RECORDING SYSTEM

(71) Applicant: Panasonic Intellectual Property Management Co., Ltd., Osaka (JP)

(72) Inventors: Akira Yamasaki, Osaka (JP); Nobuhiko Arashin, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 16/943,489

(22) Filed: Jul. 30, 2020

(65) Prior Publication Data

US 2020/0356276 A1    Nov. 12, 2020

Related U.S. Application Data

(63) Continuation of application No. PCT/JP2018/047432, filed on Dec. 25, 2018.

(30) Foreign Application Priority Data

Feb. 5, 2018    (JP) .............................. JP2018-017787

(51) Int. Cl.
 G06F 3/00       (2006.01)
 G06F 3/06       (2006.01)
 G06F 13/38      (2006.01)

(52) U.S. Cl.
 CPC ............ *G06F 3/065* (2013.01); *G06F 3/0607* (2013.01); *G06F 3/0679* (2013.01); *G06F 13/382* (2013.01); *G06F 2213/0042* (2013.01)

(58) Field of Classification Search
 None
 See application file for complete search history.

(56) References Cited

U.S. PATENT DOCUMENTS 5,930,467 A     7/1999  Morita
6,907,184 B1 *  6/2005  Yokota ................... G06F 21/10
                                              386/240

(Continued)

FOREIGN PATENT DOCUMENTS

JP      9-282103        10/1997
JP      2002-334022     11/2002

(Continued)

OTHER PUBLICATIONS

"RP 2006:2006—SMPTE Recommended Practice—Solid State Media (SSM) Card Specification," in RP 2006:2006 , vol. No., pp. 1-46, Sep. 15, 2006, doi: 10.5594/SMPTE.RP2006.2006. (Year: 2006).*

(Continued)

*Primary Examiner* — Daniel F. McMahon
(74) *Attorney, Agent, or Firm* — Wenderoth, Lind & Ponack, L.L.P.

(57)    ABSTRACT

A recording system according to the present disclosure includes a first host device, a first communication device connected to the first host device, a second host device, and a second communication device connected to the second host device. The second communication device is connected to a recording medium and wirelessly connected to the first communication device, and, when the recording medium is controlled to be writable between the second host device and the second communication device, the first communication device is configured to transmit information indicating that the recording medium is unwritable to the first host device.

6 Claims, 13 Drawing Sheets

(56) References Cited

U.S. PATENT DOCUMENTS

| | | | |
|---|---|---|---|
| 2001/0007120 A1* | 7/2001 | Makita | G06F 3/0643 711/112 |
| 2003/0200384 A1* | 10/2003 | Edanami | G06F 3/0601 711/112 |
| 2006/0038820 A1 | 2/2006 | Kitani | |
| 2007/0223879 A1* | 9/2007 | Ito | G06F 3/0619 386/241 |
| 2007/0233907 A1 | 10/2007 | Yoshikawa et al. | |
| 2010/0217787 A1* | 8/2010 | Ochi | G06F 3/0613 707/823 |
| 2013/0268802 A1* | 10/2013 | Ito | G06F 12/0246 714/6.11 |
| 2013/0290586 A1* | 10/2013 | Nakamura | G06F 21/604 710/262 |
| 2014/0059224 A1* | 2/2014 | Maeda | G06F 3/0679 709/225 |
| 2014/0059273 A1* | 2/2014 | Fujimoto | G06F 3/0661 711/103 |
| 2015/0339549 A1 | 11/2015 | Takasu | |

FOREIGN PATENT DOCUMENTS

| | | |
|---|---|---|
| JP | 2006-59179 | 3/2006 |
| JP | 2013-218499 | 10/2013 |
| JP | 2015-222491 | 12/2015 |
| WO | 2006/035738 | 4/2006 |

OTHER PUBLICATIONS

T. Hirai, "Content protection technology for a novel removable drive," in IEEE Transactions on Magnetics, vol. 41, No. 2, pp. 860-869, Feb. 2005, doi: 10.1109/TMAG.2004.840298. (Year: 2005).*

International Search Report dated Apr. 9, 2019 in corresponding International Application No. PCT/JP2018/047432.

* cited by examiner

FIG. 6

| Bit<br>Byte | 7 | 6 | 5 | 4 | 3 | 2 | 1 | 0 |
|---|---|---|---|---|---|---|---|---|
| 00-03 | dCBWSignature ||||||||
| 04-07 | dCBWTag ||||||||
| 08-0B | dCBWDataTransferLength ||||||||
| 0C | bmCBWFlags ||||||||
| 0D | 0 ||||| bCBWLUN |||
| 0E | 0 |||| bCBWCBLength ||||
| 0F-1A | CBWCB<br>(Operation Code(00h)) ||||||||

CBW(Command Block Wrapper)

FIG. 7

| Bit<br>Byte | 7 | 6 | 5 | 4 | 3 | 2 | 1 | 0 |
|---|---|---|---|---|---|---|---|---|
| 00-03 | dCSWSignature ||||||||
| 04-07 | dCSWTag ||||||||
| 08-0B | dCSWDataResidue ||||||||
| 0C | bCSWStatus<br>=0: SUCCESS<br>=1: FAILURE ||||||||

CSW(Command Status Wrapper)

FIG. 8

| Bit / Byte | 7 | 6 | 5 | 4 | 3 | 2 | 1 | 0 |
|---|---|---|---|---|---|---|---|---|
| 0 | Operation Code(1Ah) ||||||||
| 1 | | | | | DBD | | | |
| 2 | PC || Page_Code ||||||
| 3 | Subpage_Code ||||||||
| 4 | Allocation_Length ||||||||
| 5 | Control ||||||||

Mode Sense (6) Command

FIG. 9

| Bit<br>Byte | 7 | 6 | 5 | 4 | 3 | 2 | 1 | 0 |
|---|---|---|---|---|---|---|---|---|
| 0 | Mode Data Length ||||||||
| 1 | Medium Type ||||||||
| 2 | WP<br>=0: WRITABLE (OFF)<br>=1: UNWRITABLE (ON) | | | DPOFUA | | | | |
| 3 | Block Descriptor Length ||||||||

Mode Sense (6) Data

FIG. 13

| Bit<br>Byte | 7 | 6 | 5 | 4 | 3 | 2 | 1 | 0 |
|---|---|---|---|---|---|---|---|---|
| 00-03 | dCBWSignature ||||||||
| 04-07 | dCBWTag ||||||||
| 08-0B | dCBWDataTransferLength ||||||||
| 0C | bmCBWFlags ||||||||
| 0D | 0 |||||| bCBWLUN ||
| 0E | 0 |||| bCBWCBLength ||||
| 0F-1A | CBWCB<br>(Operation Code(03h))<br>Request Sense Command ||||||||

FIG. 14

| | 7 | 6 | 5 | 4 | 3 | 2 | 1 | 0 |
|---|---|---|---|---|---|---|---|---|
| 00 | Valid | Error Code (70h or 71h) | | | | | | |
| 01 | Segment Number (Reserved) | | | | | | | |
| 02 | Reserved | | ILI | Reserved | | Sense Key | | |
| 03 | Information | | | | | | | |
| 04 | | | | | | | | |
| 05 | | | | | | | | |
| 06 | | | | | | | | |
| 07 | Additional Sense Length (n-7) | | | | | | | |
| 08 | Command Specific Information | | | | | | | |
| 09 | | | | | | | | |
| 10 | | | | | | | | |
| 11 | | | | | | | | |
| 12 | Additional Sense Code | | | | | | | |
| 13 | Additional Sense Code Qualifier (Optional) | | | | | | | |
| 14 | Reserved | | | | | | | |
| 15 | | | | | | | | |
| 16 | | | | | | | | |
| 17 | | | | | | | | |
| 18 | Reserved | | | | | | | |
| n | | | | | | | | | ately
RECORDING SYSTEM

TECHNICAL FIELD

The present disclosure relates to a recording system for controlling recording of data between host devices that are wirelessly connected to each other.

BACKGROUND ART

PTL 1 discloses a memory system including a nonvolatile storage area, a first interface connected to a first host device, a second interface connected to a second host device via wireless communication, and a controller. The controller controls the first interface such that the first host device is unable to write data in the storage area when the second host device writes data in the storage area via the second interface.

CITATION LIST

Patent Literature

PTL 1: Unexamined Japanese Patent Publication No. 2013-218499

SUMMARY

However, in an environment where a file system of a host device wirelessly mounts a recording area to write a file, interruption of the wireless connection during the writing of the file may cause destruction of a file system in the recording area, resulting in inability of reading data in the recording area.

The present disclosure provides a recording system capable of preventing a host device that wirelessly accesses a writable recording medium from writing to the recording medium without operating a file system.

A recording system according to the present disclosure includes a first host device, a first communication device connected to the first host device, a second host device, and a second communication device connected to the second host device. The second communication device is connected to a recording medium and wirelessly connected to the first communication device, and, when the recording medium is controlled to be writable between the second host device and the second communication device, the first communication device is configured to transmit information indicating that the recording medium is unwritable to the first host device.

The recording system according to the present disclosure is capable of preventing the host device that wirelessly accesses the writable recording medium from writing to the recording medium without operating a file system.

BRIEF DESCRIPTION OF DRAWINGS

FIG. 6 is a diagram showing Command Block Wrapper (CBW) in a USB mass storage class packet format.

FIG. 7 is a diagram showing Command Status Wrapper (CSW) in the USB mass storage class packet format.

FIG. 8 is a diagram showing Mode Sense(6) Command in the USB mass storage class packet format.

FIG. 9 is a diagram showing Mode Sense Data in the USB mass storage class packet format.

FIG. 13 is a diagram showing Request Sense Command in the USB mass storage class packet format.

FIG. 14 is a diagram showing Request Sense Data in the USB mass storage class packet format.

DESCRIPTION OF EMBODIMENT

Hereinafter, an exemplary embodiment will be described in detail with reference to the drawings as appropriate. However, more detailed description than necessary may be omitted. For example, detailed description of well-known matters and duplicate description of a substantially identical configuration may be omitted. This is for avoiding unnecessary redundancy in the following description and facilitating understanding by those skilled in the art.

Note that the attached drawings and the following description are provided for those skilled in the art to fully understand the present disclosure, and are not intended to limit the subject matter as described in the appended claims.

EXEMPLARY EMBODIMENT

The present exemplary embodiment will be described below with reference to FIGS. 1 to 11.

1. Configuration

First, a configuration of recording system 1 according to the present exemplary embodiment will be described with reference to FIGS. 1 to 4.

Figure 1:
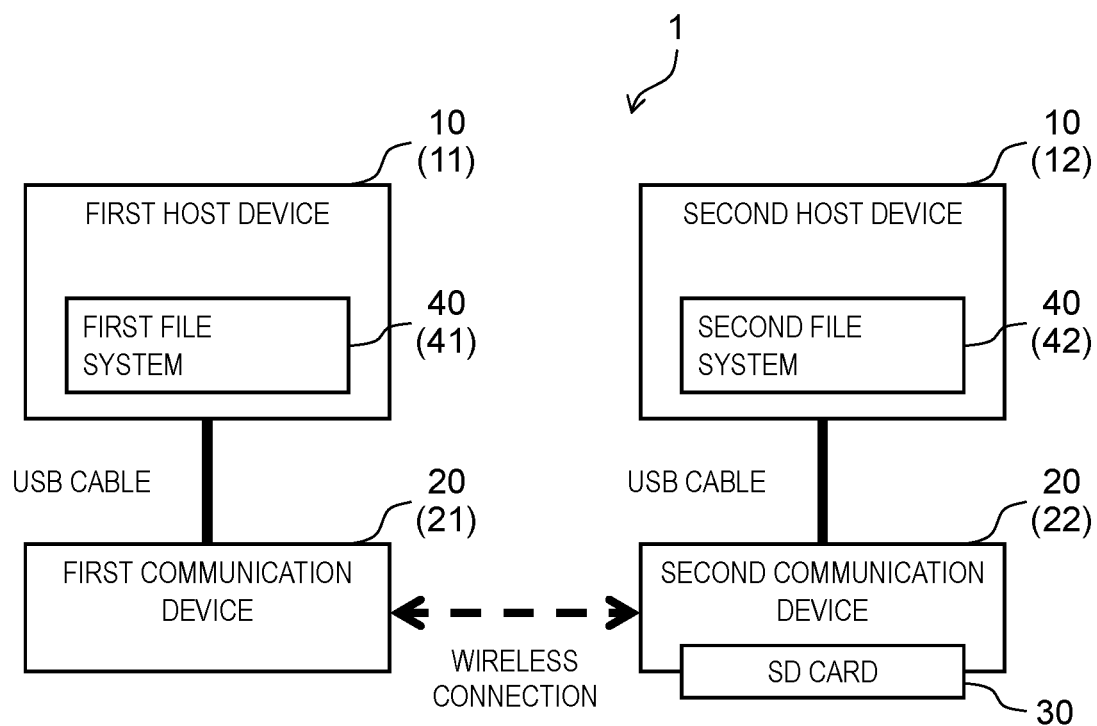
FIG. 1 is a diagram showing an example of an overall configuration of a recording system in the present exemplary embodiment.

FIG. 1 is a diagram showing an example of the overall configuration of recording system 1 in the present exemplary embodiment.

Recording system 1 has a plurality of host devices 10, a plurality of communication devices 20, and SD card 30.

Each of the plurality of host devices 10 is connected to corresponding communication device 20.

Communication devices 20 connected to different host devices 10 wirelessly communicate with each other.

In the present exemplary embodiment, when the plurality of host devices 10 are distinguished, one host device is referred to as first host device 11 and the other host device is second host device 12. Similarly, when the plurality of communication devices 20 are distinguished, communication device 20 connected to the first host device is referred to as first communication device 21, and communication device 20 connected to second host device 12 is second communication device 22.

In the present exemplary embodiment, host device 10 and communication device 20 are connected via a Universal Serial Bus (USB) cable as an example.

SD card 30 is connected to one or both communication devices 20. SD card 30 records data and the like based on information from host device 10.

Although SD card 30 is described as an example of a recording medium in the present exemplary embodiment, the present invention is not limited to an SD card.

Further, first host device 11 and second host device 12 each have file system 40 for managing data recorded in SD card 30.

In the present exemplary embodiment, when file systems 40 of respective host devices 10 are distinguished, file system 40 of first host device 11 is referred to as first file system 41, and file system 40 of second host device 12 is second file system 42.

Figure 2:
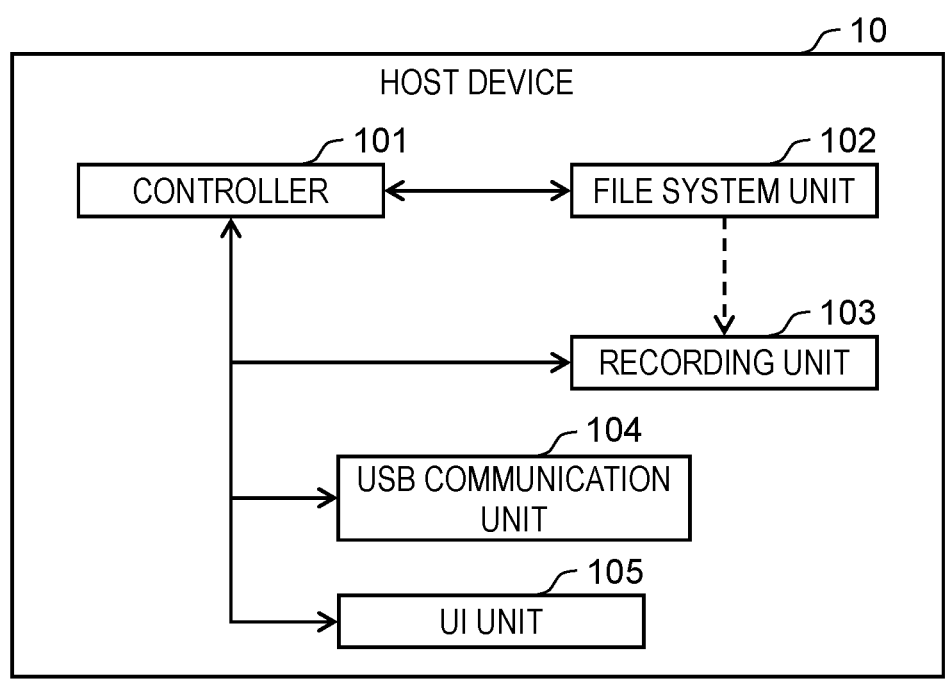
FIG. 2 is a diagram showing an example of a configuration of a first host device and a second host device of the recording system in the present exemplary embodiment.

FIG. 2 is a diagram showing an example of a configuration of host device 10 of recording system 1 in the present exemplary embodiment. Host device 10 has controller 101, file system unit 102, recording unit 103, USB communication unit 104, and UI unit 105.

Controller 101 controls host device 10. Specifically, controller 101 controls file system unit 102, recording unit 103, USB communication unit 104, UI unit 105, and the like. Controller 101 can be implemented by a central processing unit (CPU) or the like.

File system unit 102 manages file system 40. Specifically, file system unit 102 manages data read from or written to recording unit 103 as a file in accordance with information received from controller 101.

Recording unit 103 records the data managed by file system unit 102.

USB communication unit 104 is an interface with connected communication device 20. In the present exemplary embodiment, USB is used as an interface for transmitting and receiving information to and from connected communication device 20.

UI unit 105 displays operation of host device 10 to a user of host device 10, allows the user to give a command to read or write data, and displays data recorded in recording unit 103.

The operation of controller 101, file system unit 102, recording unit 103, USB communication unit 104, and UI unit 105 is merely an example, and the present invention is not limited to this operation.

Figure 3:
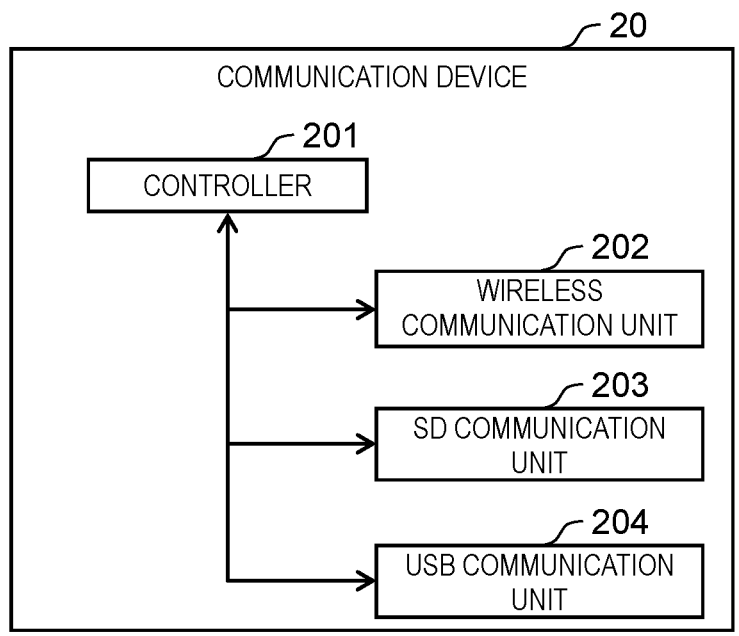
FIG. 3 is a diagram showing an example of a configuration of a first communication device and a second communication device of the recording system in the present exemplary embodiment.

FIG. 3 is a diagram showing an example of a configuration of communication device 20 of recording system 1 in the present exemplary embodiment. Communication device 20 has controller 201, wireless communication unit 202, SD communication unit 203, and USB communication unit 204.

Controller 201 controls communication device 20. Specifically, controller 201 controls wireless communication unit 202, SD communication unit 203, and USB communication unit 204. Controller 201 can be implemented by a CPU or the like.

Wireless communication unit 202 wirelessly communicates with another communication device 20. Specifically, based on control from controller 201, wireless communication unit 202 transmits and receives packets or the like to and from another communication device 20.

SD communication unit 203 is an interface for communication between communication device 20 and SD card 30. For example, packets or the like are transmitted and received between the communication device and the SD card.

USB communication unit 204 is an interface with host device 10 connected using a USB cable.

Figure 4:
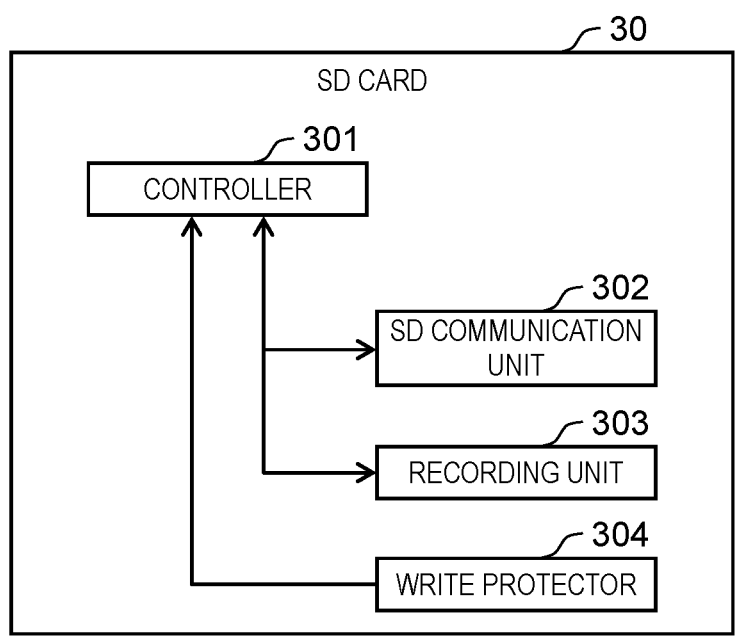
FIG. 4 is a diagram showing an example of a configuration of a recording area of the recording system in the present exemplary embodiment.

FIG. 4 is a diagram showing an example of a configuration of SD card 30 of recording system 1 in the present exemplary embodiment. SD card 30 has controller 301, SD communication unit 302, recording unit 303, and write protector 304.

Controller 301 controls SD card 30. Specifically, controller 301 controls SD communication unit 302 and recording unit 303. Controller 301 can be implemented by a CPU or the like.

SD communication unit 302 is an interface for communication with communication device 20. For example, packets or the like are transmitted and received between communication device 20 and SD card 30.

SD card 30 physically includes write protector 304 for preventing writing. Write protector 304 can be implemented by, for example, a switch. Normally, a user manually operates write protector 304 for preventing writing, so that SD card 30 (recording medium) becomes unwritable. In the present exemplary embodiment, when write protector 304 prevents writing, it is expressed that write protector 304 is on. Further, when write protector 304 does not prevent writing, it is expressed that write protector 304 is off.

2. Operation

Figure 5:
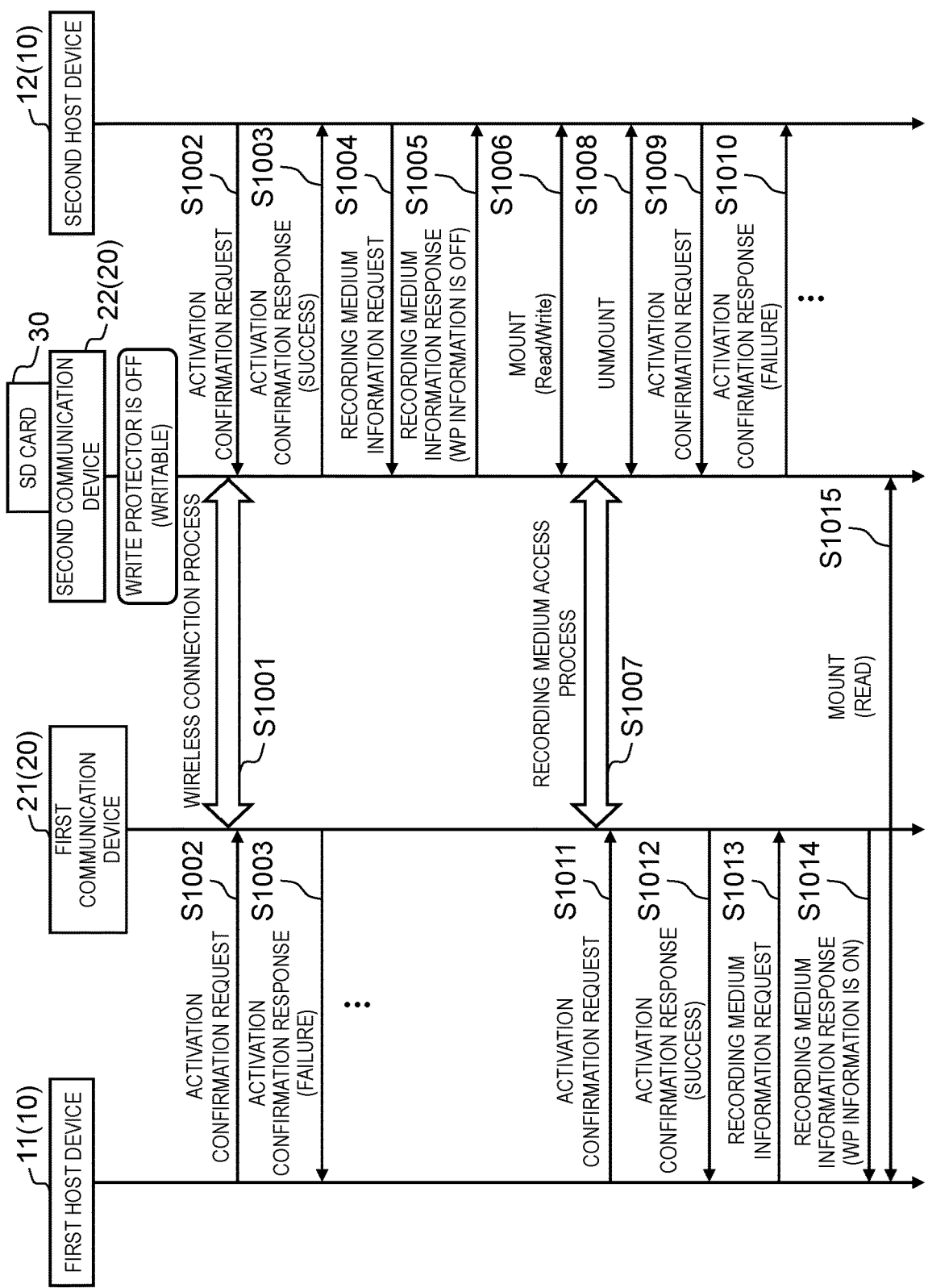
FIG. 5 is a diagram showing an example of operation of the recording system in the present exemplary embodiment.

Next, operation of recording system 1 according to the present exemplary embodiment will be described with reference to FIG. 5. FIG. 5 is a diagram showing an example of the operation of recording system 1 in the present exemplary embodiment.

In FIG. 5, SD card 30 is connected to second communication device 22 with write protector 304 off. That is, SD card 30, of which write protector 304 has been manually operated by a user in advance, is connected to second communication device 22 in a writable state.

Recording system 1 in the present exemplary embodiment operates as follows.

Based on control from host device 10 with respect to communication device 20, a wireless connection process is performed between communication devices 20 (S1001). In FIG. 5, the wireless connection process is performed between first communication device 21 and second communication device 22.

Next, host device 10 requests activation confirmation from communication device 20 to confirm activation of a drive (such as SD card 30) included in connected communication device 20 (S1002). In FIG. 5, first host device 11 and second host device 12 request activation confirmation respectively from first communication device 21 and second communication device 22.

Then, communication device 20 that has received the activation confirmation request responds about the activation confirmation (S1003). When acquiring information indicating that the activation confirmation is successful in the activation confirmation response, host device 10 can acquire information on the drive of connected communication device 20 from communication device 20. When acquiring information indicating that the activation confirmation is failed in the activation confirmation response, host device 10 ends the activation confirmation operation.

As shown in FIG. 5, since no SD card 30 is connected to first communication device 21, first host device 11 acquires information indicating failure in the response from first communication device 21 (S1003).

Further, as shown in FIG. 5, since SD card 30 is connected to second communication device 22, second host device 12 acquires information indicating success in the response from second communication device 22 (S1003).

Thus, as shown in FIG. 5, in the present exemplary embodiment, the activation differs among first host device 11, second host device 12, first communication device 21, and second communication device 22 after step S1003.

Second host device 12, upon acquiring the information indicating the success as the activation confirmation response from second communication device 22, to acquire information regarding SD card 30 of second communication device 22 (hereinafter, recording medium information), requests the recording medium information from second communication device 22 (S1004).

The information regarding SD card 30 includes Write Protect (WP) information that is information for determining whether the write protector of SD card 30 is on or off.

Then, second communication device 22 responds about the recording medium information request by second host device 12 (S1005).

In the present exemplary embodiment, second communication device 22 transmits WP information indicating that SD card 30 is writable since the write protector of SD card 30 is set to OFF. Note that, in the present exemplary embodiment, when SD card 30 is writable, it is expressed that WP information is off.

Second host device 12, upon acquiring the recording medium information including the WP information that is off from second communication device 22, enables access between second host device 12 and SD card 30 with SD card 30 determined to be writable (S1006). That is, second host device 12 can both read and write data that is recorded in SD card 30.

Subsequently, upon second communication device 22 acquiring a request to mount SD card 30 from first host device 11 via first communication device 21, a recording medium access process is performed between first communication device 21 and second communication device 22 (S1007).

Here, the recording medium access process is a process for achieving such operation that first host device 11 accesses SD card 30 that works with second host device 12 just like accessing recording unit 103 of first host device 11.

In the present exemplary embodiment, WiGig SD Extension Protocol Adaptation Layer (WSDPAL) is used as a communication protocol of the recording medium access process that is performed wirelessly.

Here, WSDPAL is a layer on which Wireless Gigabit (WiGig) (registered trademark) is connected with an application that utilizes access to a normal SD card.

WSDPAL allows an application of first host device 11 to regard recording unit 303 in SD card 30 as the same as recording unit 103. This can make access from recording unit 103 of first host device 11 to SD card 30 faster than normal access between host devices 10, and take advantage of communication speed of WiGig as a high-speed communication method.

Specifically, WSDPAL converts general Read and Write commands that are normally issued so that first communication device 21 can access the recording unit of SD card 30 just like accessing its own storage unit.

When WSDPAL succeeds, SD card 30 is changed to an inaccessible state (unmounted) between second host device 12 and second communication device 22 (S1008).

Thus, second host device 12, even when requesting activation confirmation from second communication device 22 (S1009), acquires information indicating failure as an activation confirmation response from second communication device 22 (S1010).

When WSDPAL fails, WSDPAL is ended unless first host device 11 re-requests WSDPAL.

Next, when the recording medium access process is completed, first host device 11 requests activation confirmation from first communication device 21 as in step S1002 (S1011).

Then, first communication device 21 that has received the activation confirmation request from first host device 11 responds about the activation confirmation (S1012).

Here, in the activation confirmation response in step S1012, first communication device 21 responds that the activation confirmation is successful since access to SD card 30 has been enabled in the recording medium access process.

First host device 11, upon acquiring information indicating that the activation confirmation is successful in the activation confirmation response from first communication device 21, to acquire recording medium information that is information regarding SD card 30 of second communication device 22, requests the recording medium information from second communication device 22 (S1013).

First communication device 21 responds to the request for the recording medium information by first host device 11, with information changed differently from the WP information acquired from second communication device 22 in the recording medium access process (S1014). That is, even when the recording medium information acquired by second communication device 22 is off, first communication device 21 responds that the WP information is on to first host device 11.

Upon first host device 11 acquiring the recording medium information including the WP information that is on from first communication device 21, file system 41 of first host device 11 enables access between first host device 11 and SD card 30 with SD card 30 determined to be unwritable (S1015). That is, first host device 11 can only read data that is recorded in SD card 30, and cannot write data.

As described above, in the present exemplary embodiment, even when write protector 304 of SD card 30 included in second communication device 22 permits writing, operation of data in SD card 30 by first host device 11 can be limited to reading by changing the WP information.

Next, as in the present exemplary embodiment, when host device 10 and communication device 20 are connected via a USB cable, the activation confirmation request from host device 10 to communication device 20 and the response to the activation confirmation request from communication device 20 to host device 10 will be described.

FIG. 6 is a diagram showing Command Block Wrapper (CBW) in a USB mass storage class packet format.

The USB mass storage class is a class standardized for writing and reading data in a recording medium such as SD card 30 connected to host device 10 or communication device 20.

CBW is a command used for the activation confirmation request in FIG. 5. Contents of CBW are as follows.

dCBWSignature: Signature dCBWTag: Tag of which number is defined by host device 10 dCBWDataTransferLength: Length of data transferred in data phase bmCBWFlags: Flag indicating a transfer direction bCBWLUN: Specifies a drive number when a plurality of drives are connected to one USB device bCBWCBLength: Command packet length CBWCB: Command packet data When activation confirmation is requested in FIG. 5, the CBWCB transmitted by host device 10 includes Operation Code of ooh.

FIG. 7 is a diagram showing Command Status Wrapper (CSW) in the USB mass storage class packet format.

CSW is a command used for, for example, the response to the activation confirmation request in FIG. 5. Contents of CSW are as follows.

dCSWSignature: Signature dCSWTag: Tag of which number is defined by host device 10 dCSWDataResidue: Amount of data residue with respect to the DataTransferLength requested in CBW bCSWStatus: Result status for CBW Here, the bCSWStatus having a value of 0 indicates success for the request of CBW. The bCSWStatus having a value of 1 indicates failure for the request of CBW.

Accordingly, in step S1003 in FIG. 5, communication device 20 that has received activation confirmation request from host device 10 responds about the activation confirmation with the value of bCSWStatus being 0 when sending information indicating that the activation confirmation is successful, and with the value of bCSWStatus being 1 when sending information that the activation confirmation is failed.

Next, as in the present exemplary embodiment, the request for recording medium information included in communication device 20 from host device 10 and the response to the recording medium information request from communication device 20 to host device 10 will be described.

FIG. 8 is a diagram showing Mode Sense(6) Command in the USB mass storage class packet format.

Mode Sense(6) Command is a command used for the recording medium information request in FIG. 5. Contents of Mode Sense(6) Command are as follows.

Operation Code: Operation code

DBD: Disables a block descriptor

PC: Page control

Page_Code: Code for pages

Subpage_Code: Code for subpages

Allocation_Length: Maximum number of bytes that are transferred

Control: Specific value for control

When recording medium information is requested as shown in FIG. 5, the Operation Code is 1Ah.

FIG. 9 is a diagram showing Mode Sense(6) Data in the USB mass storage class packet format.

Mode Sense(6) Data is a command used for the response to the recording medium information request in FIG. 5. Contents of Mode Sense(6) Data are as follows.

Mode Data Length: Mode data length

Medium Type: Type of medium

WP: Information on write protection

DPOFUA: Device-specific parameter

Block Descriptor Length: Block descriptor length

Here, the WP corresponds to WP information. Thus, host device 10 makes determination about WP information regarding SD card 30 based on the WP acquired from communication device 20. Specifically, the WP having a value of 0 indicates that writing is enabled (off). The WP having a value of 1 indicates that writing is disabled (on).

Thus, in FIG. 5, second host device 12 acquires Mode Sense(6) Data with the value of WP being 0 from second communication device 22.

Further, in FIG. 5, first host device 11 after the recording medium access process acquires Mode Sense(6) Data with the value of WP being 1 from first communication device 21.

Consequently, when the USB mass storage class packet format is used, it is possible to determine whether writing is enabled based on the value of WP in Mode Sense(6) Data. As described above, using the USB mass storage class packet format can achieve the operation as shown in FIG. 5.

Figure 10:
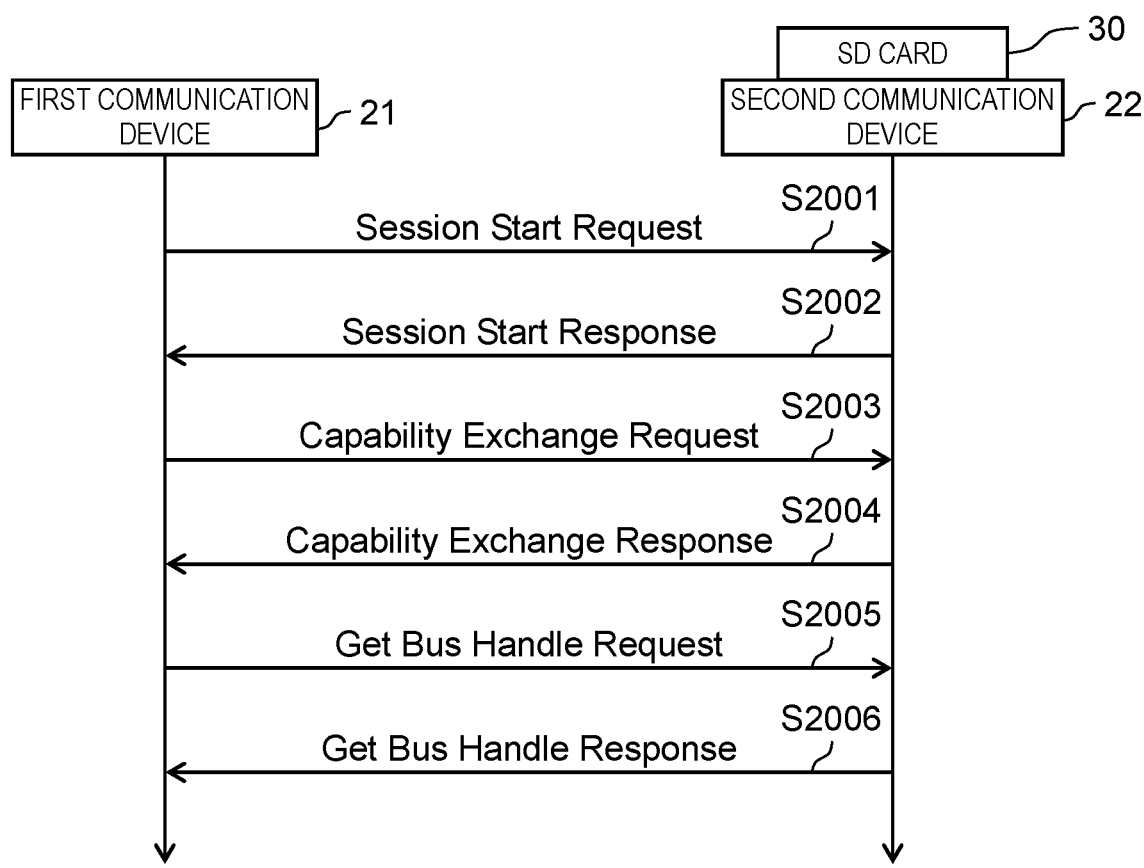
FIG. 10 is a diagram showing operation of a WiGig SD Extension Protocol Adaptation Layer (WSDPAL) connection.

Next, operation of WSDPAL will be described as an example of the recording medium access process. FIG. 10 is a diagram showing operation of the recording medium access process in a WSDPAL connection.

First, first communication device 21 transmits Session Start Request to start a connection with second communication device 22 having SD card 30 (S2001).

Upon receiving the Session Start Request, second communication device 22 transmits Session Start Response (S2002).

First communication device 21, when receiving no Session Start Response from second communication device 22 within a fixed time, may transmit the Session Start Request again.

First communication device 21 that has received the Session Start Response then transmits Capability Exchange Request (S2003).

Here, the Capability Exchange Request is a request for acquiring recording medium information regarding SD card 30.

Upon receiving the Capability Exchange Request, second communication device 22 transmits Capability Exchange Response including recording medium information (S2004).

The recording medium information includes WP information, and second communication device 22 may change the WP information from ON to OFF when transmitting the Capability Exchange Response to first communication device 21. More specifically, when the USB mass storage class packet format is used, the value of WP in Mode Sense(6) Data may be changed from 1 to 0, and the Capability Exchange Response may be transmitted.

First communication device 21 that has received the Capability Exchange Response transmits Get BUS Handle Request for connection with SD card 30 (S2005), and then receives Get BUS Handle Response from second communication device 22 (S2006).

As described above, operation as shown in FIG. 5 can be achieved by transmitting WP information from second communication device 22 to first communication device 21 during the recording medium access process in WSDPAL.

Figure 11:
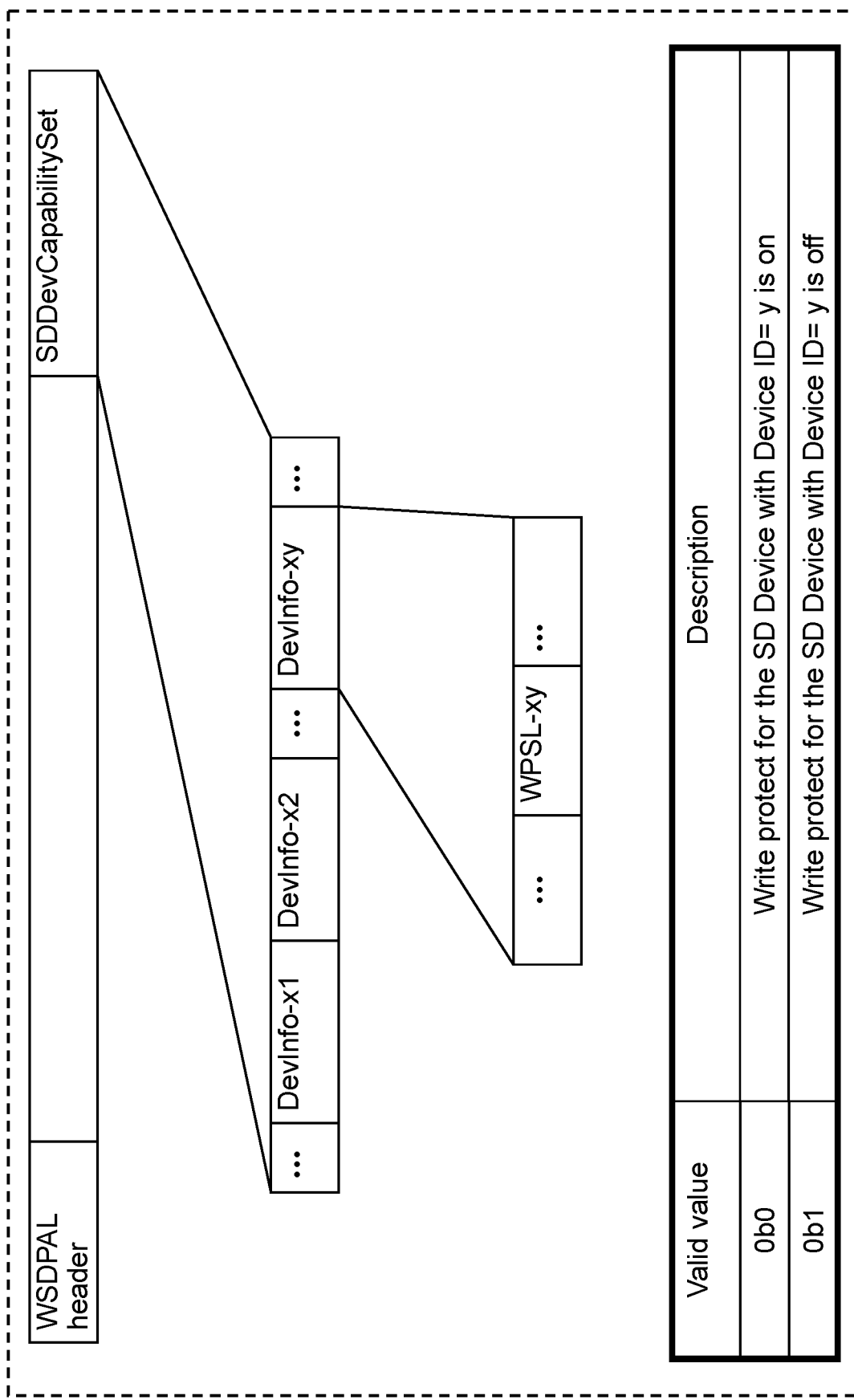
FIG. 11 is a diagram showing a WSDPAL packet format.

Particularly, as illustrated in FIG. 11 showing the Capability Exchange Response in a WSDPAL packet format, WPSL-xy having a value of 0b0, which is included in DevInfo-xy in SD Dev Capability Set, indicates that writing is disabled (off), and WPSL-xy having a value of 0b1 indicates that writing is enabled (on).

This can achieve transmission and reception of WP information in WSDPAL in FIG. 5.

3. Advantageous Effect

As described above, the recording system according to the present exemplary embodiment includes a first host device, a first communication device connected to the first host device, a second host device, and a second communication device connected to the second host device. The second communication device is connected to a recording medium such as an SD card, for example, and wirelessly connected to the first communication device, and, when the recording medium is controlled to be writable between the second host device and the second communication device, the first host device is controlled to be unable to write to the recording medium.

As a result, the recording system according to the present exemplary embodiment can prevent the host device that wirelessly accesses the writable recording medium from writing to the recording medium without operating the accessing host device.

Specifically, in a conventional recording system, destruction of a File Allocation Table (FAT) that manages usage status and link information of a user data area in SD card 30 would cause a loss of ability to specify a storage seat of file data and to read files recorded in SD card 30, resulting in a problem that the SD card have to be formatted.

When first host device 11 remotely accesses SD card 30 included in second host device 12, recording system 1 according to the present exemplary embodiment makes remotely accessing first host device 11 unable to write to SD card 30. Therefore, it is possible to prevent writing to SD card 30 and destruction of a FAT due to interruption of the wireless connection during writing. In recording system 1 according to the present exemplary embodiment, first host device 11 receives WP information indicating that writing is disabled from second host device 12 via first communication device 21, and determines that the recording medium is unwritable.

It may be said that remotely accessing first host device 11 is unable to write to the recording medium by receiving the WP information indicating that writing is disabled from second host device 12.

As a result, first host device 11 can recognize that the recording medium is unwritable.

(Other)

In recording system 1 according to the present exemplary embodiment, first host device 11, which determines that writing is disabled, can be notified of a writing error even when re-requesting writing to the recording medium.

Figure 12:
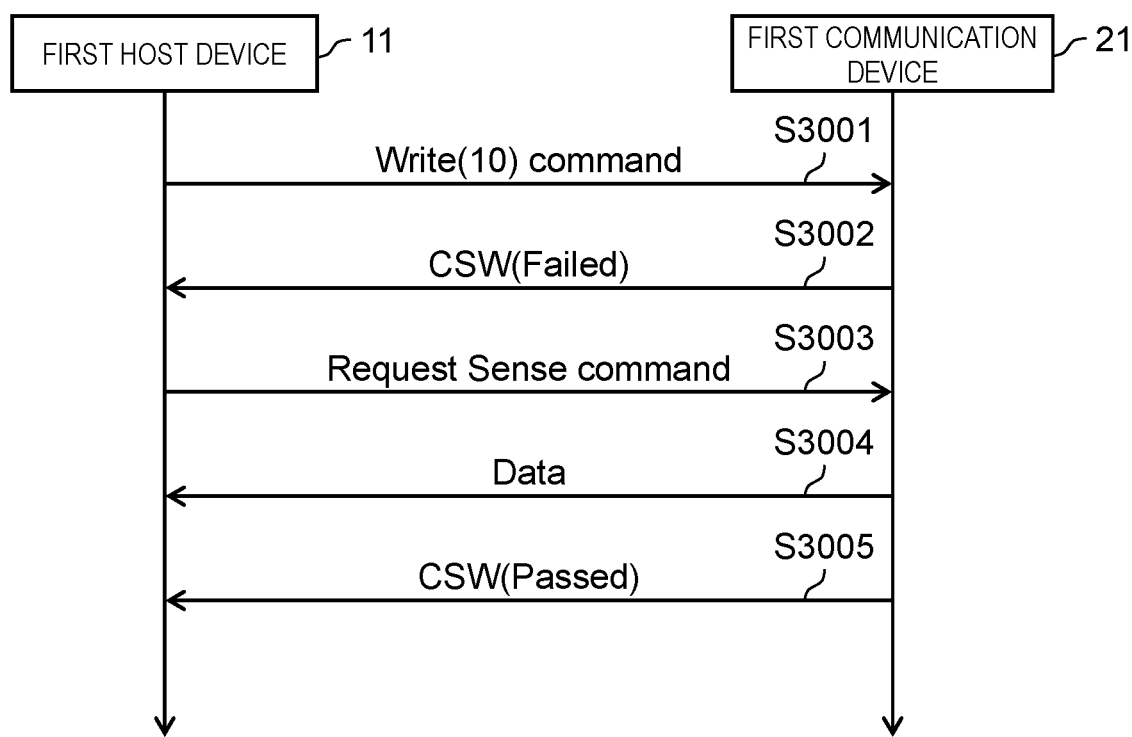
FIG. 12 is a diagram showing an example of processing in an event of writing error of the recording system in the present exemplary embodiment.

FIG. 12 is a diagram showing an example of processing in the event of writing error of recording system 1 in the present exemplary embodiment.

First, first host device 11 transmits Write(10) command as a write request command to first communication device 21 (S3001).

Then, first communication device 21 that has received the Write(10) command transmits information indicating writing failure in CSW, based on WP information from second communication device 22 indicating that SD card 30 is unwritable (S3002).

First host device 11 that has received the information indicating the writing failure transmits Request Sense Command to identify a reason for the writing failure (S3003). Specifically, as shown in FIG. 13, Request Sense Command in the USB mass storage class packet format is transmitted with Operation Code of CBWCB being 03h.

First communication device 21 that has received the Request Sense Command transmits Request Sense Data to first host device 11 (S3004).

Here, when Request Sense Data in the USB mass storage class packet format shown in FIG. 14 is used, first communication device 21 transmits the Request Sense Data to first host device 11 with a value of Sense Key being 7h, a value of Additional Sense Code being 27h, and a value of Additional Sense Code Qualifier being 0h. As a result, first host device 11 receives WP information indicating that SD card 30 is unwritable, that is, first host device 11 is notified of a writing error and thus unable to write to SD card.

As described above, by the processing in the event of writing error shown in FIG. 12, first communication device 21 can also notify first host device 11 of a writing error since first host device 11 is controlled to be unable to write to the recording medium.

As described above, the exemplary embodiment has been described as an example of the technology according to the present disclosure. To that end, the accompanying drawings and detailed description are provided.

Accordingly, the constituent elements described in the accompanying drawings and the detailed description may include not only constituent elements that are essential for solving the problem, but also constituent elements that are non-essential for solving the problem, for illustrating the above technology. Thus, it should not be immediately recognized that these non-essential constituent elements are essential since the non-essential constituent elements are described in the accompanying drawings and the detailed description.

Further, since the above-described exemplary embodiment is intended to illustrate the technology according to the present disclosure, various modifications, replacements, additions, omissions, and the like can be made within the scope of the claims or their equivalents.

INDUSTRIAL APPLICABILITY

The recording system according to the present disclosure is useful when a host device remotely accesses a recording medium included in another host device. Specifically, the recording system is useful in a wireless communication system between a surveillance camera and a wireless terminal that wirelessly communicates with the surveillance camera, the surveillance camera connected to a communication device and configured to record data on a recording medium included in the communication device.

REFERENCE MARKS IN THE DRAWINGS 1 recording system
10 host device
11 first host device
12 second host device
20 communication device
21 first communication device
22 second communication device
30 SD card
101 controller
102 file system unit
103 recording unit
104 USB communication unit
105 UI unit
201 controller
202 wireless communication unit
203 SD communication unit
204 USB communication unit
301 controller
302 SD communication unit
303 recording unit
304 write protector

The invention claimed is:
1. A recording system, comprising:
a first host device;

a first communication device connected to the first host device;
a second host device; and
a second communication device connected to the second host device, wherein
the second communication device is connected to a recording medium and wirelessly connected to the first communication device, and
when the recording medium is controlled to be writable between the second host device and the second communication device, the first communication device is configured to transmit write protect (WP) information indicating that the recording medium is unwritable to the first host device, and wherein
the first host device has a first file system,
the second host device has a second file system different from the first file system,
the first file system of the first host device is only able to read from the recording medium, and
the second file system of the second host device is able to read from and write to the recording medium.

2. The recording system according to claim 1, wherein the first host device is configured to, when receiving the WP information from the first communication device, determine that the recording medium is unwritable.

3. The recording system according to claim 1, wherein the WP information is information indicating that a File Allocation Table (FAT) in the recording medium is unwritable.

4. A recording system, comprising:
a first host device;
a first communication device connected to the first host device;
a second host device; and
a second communication device connected to the second host device, wherein
the second communication device is connected to a recording medium and wirelessly connected to the first communication device, and
when a physically included write protector of the recording medium is off so that the recording medium is in a state to be writable,
the second communication device is configured to derive a first write protect (WP) information indicating that the recording medium is writable, and
the first communication device is configured to acquire the first WP information and to change the acquired first WP information differently to a second WP information, and to transmit the second WP information to the first host device, the second WP information indicating that the recording medium is unwritable.

5. The recording system according to claim 4, wherein WiGig SD Extension Protocol Adaptation Layer (WSD-PAL) is used as a communication protocol of a recording medium access process that is performed wirelessly.

6. The recording system according to claim 4, wherein
the first host device is only able to read from the recording medium, and
the second host device is able to read from and write to the recording medium.

* * * * *